United States Patent
Agarwal et al.

(10) Patent No.: US 12,019,542 B2
(45) Date of Patent: Jun. 25, 2024

(54) HIGH PERFORMANCE CACHE EVICTION

(71) Applicant: Google LLC, Mountain View, CA (US)

(72) Inventors: Abhishek Agarwal, Santa Clara, CA (US); Jiazhen Zheng, Santa Clara, CA (US); Srinivas Vaduvatha, San Jose, CA (US); Weihuang Wang, Los Gatos, CA (US); Hugh McEvoy Walsh, Los Gatos, CA (US); Weiwei Jiang, Santa Clara, CA (US); Ajay Venkatesan, Milpitas, CA (US); Prashant R. Chandra, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/882,802

(22) Filed: Aug. 8, 2022

(65) Prior Publication Data
US 2024/0045800 A1 Feb. 8, 2024

(51) Int. Cl.
*G06F 12/0802* (2016.01)
(52) U.S. Cl.
CPC ...... *G06F 12/0802* (2013.01); *G06F 2212/60* (2013.01)
(58) Field of Classification Search
CPC ............. G06F 12/0802; G06F 2212/60; H04L 67/568; H04L 67/5682; H04L 67/14; H04L 45/742
See application file for complete search history.

(56) References Cited

U.S. PATENT DOCUMENTS

| | | | |
|---|---|---|---|
| 6,766,419 B1 | 7/2004 | Zahir et al. | |
| 7,130,912 B2* | 10/2006 | Nishikado | H04L 67/01 709/227 |
| 8,244,880 B2 | 8/2012 | Faucher et al. | |
| 8,812,817 B2 | 8/2014 | Fuller et al. | |
| 8,943,272 B2 | 1/2015 | Bell, Jr. et al. | |
| 8,966,184 B2 | 2/2015 | Atkisson | |
| 9,292,445 B2 | 3/2016 | Bronson et al. | |
| 9,355,036 B2 | 5/2016 | Beard et al. | |
| 10,102,150 B1 | 10/2018 | Visvanathan et al. | |
| 10,216,632 B2 | 2/2019 | Kass | |
| 10,417,134 B2 | 9/2019 | Faldu et al. | |
| 10,762,000 B2 | 9/2020 | Chang et al. | |

(Continued)

FOREIGN PATENT DOCUMENTS

| | | |
|---|---|---|
| CN | 105812285 A | 7/2016 |
| CN | 115934360 A | 4/2023 |

OTHER PUBLICATIONS

Extended European Search Report for European Patent Application No. 23156266.1 dated Dec. 12, 2023. 8 pages.

(Continued)

*Primary Examiner* — Idriss N Alrobaye
*Assistant Examiner* — Richard B Franklin
(74) *Attorney, Agent, or Firm* — Lerner David LLP

(57) ABSTRACT

Aspects of the disclosure are directed to high performance connection cache eviction for reliable transport protocols in data center networking. Connection priorities for connection entries are determined to store the connection entries in a cache based on their connection priority. During cache eviction, the connection entries with a lowest connection priority are evicted from the cache. Cache eviction can be achieved with low latency at a high rate.

20 Claims, 7 Drawing Sheets

(56) References Cited

U.S. PATENT DOCUMENTS

| | | |
|---|---|---|
| 10,841,394 B2 * | 11/2020 | Ideguchi ............... H04L 67/146 |
| 10,915,461 B2 | 2/2021 | Ambroladze et al. |
| 10,983,922 B2 | 4/2021 | Gupta et al. |
| 11,301,394 B2 | 4/2022 | Gupta et al. |
| 11,467,972 B2 | 10/2022 | Reed et al. |
| 2017/0168944 A1 | 6/2017 | van Greunen et al. |
| 2019/0273803 A1 | 9/2019 | Ideguchi et al. |
| 2021/0124694 A1 | 4/2021 | Verplanken |
| 2021/0185139 A1 | 6/2021 | Wang et al. |

OTHER PUBLICATIONS

International Search Report and Written Opinion for PCT Application No. PCT/US2023/035581, dated Feb. 6, 2024. 13 pages.

* cited by examiner

HIGH PERFORMANCE CACHE EVICTION

BACKGROUND

Reliable transport protocols can support a large number of connections. Due to the large number of connections, the total memory required to store information for the connections, such as security information, congestion control information, routing information, etc., can be too much data to simply store the connection information in a cache. Thus, only a subset of the connection information can be stored in the cache while the remaining connection information can be stored in other memory. Information for a connection can be fetched from the other memory to be stored in the cache when a request is received. When all transactions for that connection are complete, the connection can be evicted from the cache back to the other memory. However, fetching connection information when a request is received can slow down transactions. Further, keeping connection information in the cache when transactions for that connection are not being performed can waste space in the cache.

BRIEF SUMMARY

Aspects of the disclosure are directed to high performance connection cache eviction for reliable transport protocols in data center networking. Connection priorities for connection entries are determined to store the connection entries in a cache based on their connection priority. During cache eviction, the connection entries with a lowest connection priority are evicted from the cache. Cache eviction can be achieved with low latency at a high rate.

An aspect of the disclosure provides for a method for evicting connection entries from a cache. The method includes determining, with one or more processors, a connection priority for each of a plurality of connection entries based on a likelihood of receiving a transaction for each of the connection entries; storing, with the one or more processors, each of the plurality of connection entries in at least one priority queue in the cache based on the determined connection priority for each connection entry; and evicting, with the one or more processors, a connection entry of the plurality of connection entries from the at least one priority queue when an occupancy of the cache is above an eviction threshold, the connection entry being evicted having a lowest determined connection priority.

As an example, the likelihood of receiving the transaction is based on a resource count and a recency of receiving a previous transaction. As another example the resource count includes an amount of outstanding transactions. As yet another example, determining the connection priority for each of the plurality of connection entries further includes determining, with the one or more processors, an initial connection priority for a connection entry of the plurality of connection entries based on a resource count; and reducing, with the one or more processors, the initial connection priority based on the recency of receiving a previous transaction to determine the connection priority for the connection entry.

As yet another example, the method further includes updating, with the one or more processors, the connection priority of at least one connection entry of the plurality of connection entries. As yet another example, updating the connection priority of the at least one connection entry includes moving the at least one connection entry from its existing slot in a respective priority queue to a tail of the same priority queue. As yet another example, updating the connection priority of the connection entry includes moving the connection entry from its existing slot in a respective priority queue to a tail of a different priority queue. As yet another example, the method further includes pushing, with the one or more processors, a new connection entry to a tail of at least one priority queue based on a determined priority for the new connection entry.

As yet another example, storing the plurality of connection entries further includes storing lower priority connection entries closer to a head of the at least one priority queue and higher priority connection entries closer to a tail of the at least one priority queue. As yet another example, evicting the one or more connection entries further includes evicting a connection entry at a head of the at least one priority queue.

Another aspect of the disclosure provides for a system including one or more processors; and one or more storage devices coupled to the one or more processors and storing instructions that, when executed by the one or more processors, causes the one or more processors to perform operations for evicting connection entries from a cache. The operations include determining a connection priority for each of a plurality of connection entries based on a likelihood of receiving a transaction for each of the connection entries; storing each of the plurality of connection entries in at least one priority queue in the cache based on the determined connection priority for each connection entry; and evicting a connection entry of the plurality of connection entries from the at least one priority queue when an occupancy of the cache is above an eviction threshold, the connection entry being evicted having a lowest determined connection priority.

As an example, the likelihood of receiving the transaction is based on a resource count and a recency of receiving a previous transaction, the resource count comprising an amount of outstanding transactions. As another example, determining the connection priority for each of the plurality of connection entries further includes determining an initial connection priority for a connection entry of the plurality of connection entries based on a resource count; and reducing the initial connection priority based on the recency of receiving a previous transaction to determine the connection priority for the connection entry.

As yet another example, the operations further include updating the connection priority of at least one connection entry of the plurality of connection entries. As yet another example, updating the connection priority of the at least one connection entry includes moving the at least one connection entry from its existing slot in a respective priority queue to a tail of the same priority queue. As yet another example, updating the connection priority of the connection entry includes moving the connection entry from its existing slot in a respective priority queue to a tail of a different priority queue. As yet another example, the operations further include pushing, with the one or more processors, a new connection entry to a tail of at least one priority queue based on a determined priority for the new connection entry.

As yet another example, storing the plurality of connection entries further includes storing lower priority connection entries closer to a head of the at least one priority queue and higher priority connection entries closer to a tail of the at least one priority queue. As yet another example, evicting the one or more connection entries further includes evicting a connection entry at a head of the at least one priority queue.

Yet another aspect of the disclosure provides for a non-transitory computer readable medium for storing instructions that, when executed by one or more processors, causes the one or more processors to perform operations for evicting connection entries from a cache. The operations include determining a connection priority for each of a plurality of connection entries based on a likelihood of receiving a transaction for each of the connection entries; storing each of the plurality of connection entries in at least one priority queue in the cache based on the determined connection priority for each connection entry; and evicting a connection entry of the plurality of connection entries from the at least one priority queue when an occupancy of the cache is above an eviction threshold, the connection entry being evicted having a lowest determined connection priority.

DETAILED DESCRIPTION

Figure 1:
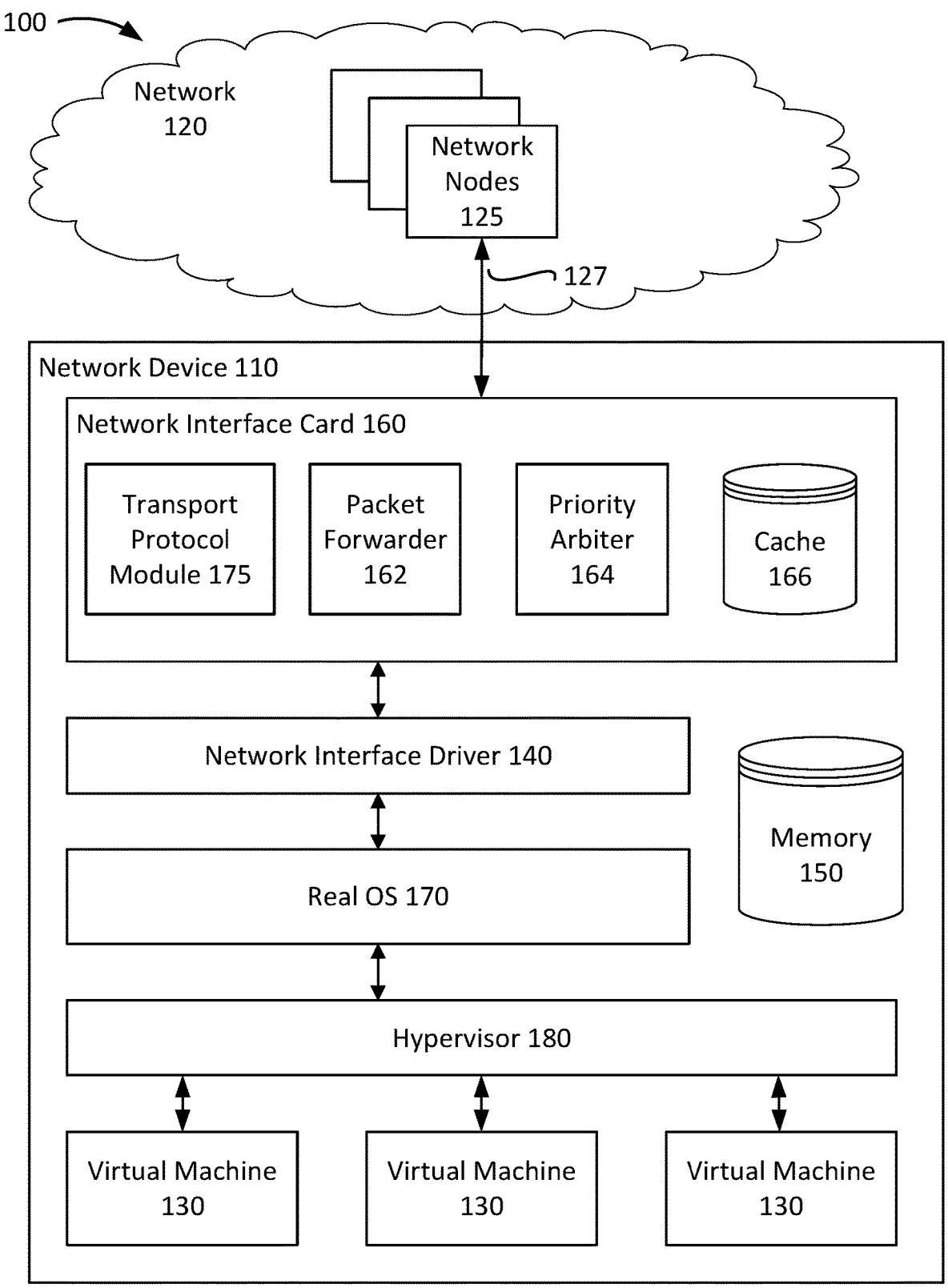
FIG. 1 depicts a block diagram of an example network environment with a network device according to aspects of the disclosure.

Generally disclosed herein are implementations for evicting connection entries in data center networking for reliable transport protocols. Connection entries are stored in a cache based on a determined connection priority for each connection entry. The connection entries with lower connection priority are evicted from the cache when an eviction threshold is met. Connection entries can be evicted with low latency at a high rate, leading to higher performance for transactions in the data center networking.

Connection priority is classified based on a likelihood of receiving another transaction for the connection. Parameters to determine connection priority can include resource count and recency. Resource count can include an amount of outstanding transactions based on packet context, buffer for transmitter, and/or buffer for receiver. With respect to recency, an initial priority can be determined based on the resource count for a connection and the priority can be reduced over time based on an aging function.

When an occupancy of the cache is above an eviction threshold, connections to be evicted are identified, starting with lowest priority connections. The eviction threshold can be based on a total number of connection entries supported in the cache. For example, the eviction threshold can be equal to the total number of connection entries or can be a number of connection entries less than the total number of connection entries.

Incoming connection entries are stored in multiple priority queues. The number of priority queues and a scheme for pushing a connection entry into a priority queue can be configurable. For example, the connection entry can be pushed into the lowest available priority queue. Queues can be assigned a fixed priority in terms of which connection entries to pick first during eviction. Priority assignment can be implemented by instantiating logic when a connection entry is pushed into the corresponding queue based on the incoming priority on an input interface.

A priority for an existing connection entry can be changed. In this example, the connection entry can be deleted from its current queue and pushed to a tail of a new priority queue. Further, if an existing connection entry is updated in the same queue, the connection entry can be moved from its existing place in the queue to the tail of the queue. This can ensure most recently accessed connection entries are at the tail of the queue and least recently accessed connection entries are at the head of the queue.

An eviction threshold can be maintained based on the total number of supported connection entries. The eviction process is initiated once the eviction threshold is reached. The eviction can start from a head of a first priority queue and move onto a subsequent priority queue once all connection entries in the first priority queue have been evicted. Eviction can be implemented using a strict priority arbiter. Evicted entries can be deallocated from the queue.

Three cache operations are generally supported: a push operation, an update operation, and a pop operation. For the push operation, a connection entry can be added to a tail of a corresponding queue based on its input priority. For the update operation, a connection entry can be moved from its existing place in a queue to the tail of the queue or the connection entry can be deleted from the queue and added to the tail of a new queue. For the pop operation, the connection entry can be evicted from the head of the queue and subsequent entries can be moved up to the head of the queue.

Update operations can include 1 read and 2 writes each in subsequent pointer and previous pointer memories. Therefore, the memories can be 1r2w memories. A 1r2w memory can be configured using a live value table (LVT) approach which uses one RAM per write port. To support 2 writes per cycle, two 1R1W RAMs can be used. A first write port can write in a first RAM and a second write port can write in a second RAM. When either port writes, they can also update a corresponding entry in the LVT. Since both ports can write in the LVT each cycle, the LVT can be implemented in flops. The LVT can maintain a bit per entry to identify the RAM which has a latest value for a particular address. At a time of reading, both RAMs can be read along with the LVT and the output LVT value can be used to select the output data from the RAMs.

FIG. 1 depicts a block diagram of an example network environment 100 with a network device 110. The network environment 100 includes a network 120 of interconnected network nodes 125. The network nodes 125 participate in the network 120 as data sources, data destinations or data sinks, and/or intermediary nodes such as switches, routers, and/or gateways propagating data from sources towards destinations through the network 120. The network 120 includes the network device 110 with links 127 to various other participating network nodes 125.

The network 120 can facilitate interactions between participant devices. Example networks include the Internet, a local network, a network fabric, or any other local area or wide area network. The network 120 can be composed of multiple connected sub-networks or autonomous networks. The network 120 can be a local-area network (LAN), such as a company intranet, a metropolitan area network (MAN), a wide area network (WAN), an inter-network such as the Internet, or a peer-to-peer network. Any type and/or form of data network and/or communication network can be used for the network 120. The network can be public, private, or a combination of public and private. In general, the network 120 can be used to convey information between computing devices; for example, network nodes 125, and the network device 110.

The network device 110 can be a host device or server executing one or more virtual machines 130 on one or more processors of the network device 110. The network device 110 can include a network interface driver 140, a memory 150, a network interface card 160, a real operating system (OS) 170, a hypervisor 180, and the virtual machines 130. The network device 110 can communicate with other network devices over the network 120. The network device 110 and other network devices can create or participate in one or more virtual networks to facilitate communication between virtual machines 130. The one or more virtual networks can overlay the physical network that makes up the network 120. Data packets can be routed within one of the virtual networks overlaying the physical network using a system of data packet encapsulation. The network device 110 and the network nodes 125 can route the data packets according to virtual Internet protocol addresses (VIPs) and MAC addresses. In some examples, the network device 110 can host one or more virtual machines 130 that transmit data packets or receive data packets. In other examples, the network device 110 can be an intermediate node of a path between two virtual machines executing on two separate network devices. Accordingly, the network device 110 can act as a source, destination, or intermediate switch in one or more virtual networks.

The hypervisor 180 can manage operation of the virtual machines 130, including spinning up and terminating the virtual machines 130, managing allocation of memory 150 to the virtual machines 130, and live migrating the virtual machines 130 to other network devices.

The memory 150 can store data and/or computer executable instructions related to the operation and use of the network interface driver 140. For example, the memory 150 can store connection entries, including per connection information required to process a transmission or reception request. The information per connection can include security information, congestion control information, and routing information, as examples. The memory 150 can include a high bandwidth memory (HBM), a dynamic random access memory (DRAM), a synchronous dynamic random access memory (SDRAM), and/or a flash memory, as examples.

The memory 150 can store computer executable instructions of a transport protocol module 175, such as a transmission control protocol (TCP) module or the TCP layer of a network stack, to be executed on a processor of the network device 110. Functionality occurring within a TCP layer of a network stack can be additionally or alternatively executed in another network protocol module within the transport layer, the network layer, or a combined transport/network layer of a network stack. For example, the functionality can be implemented in a user datagram protocol (UDP) module, reliable datagram protocol (RDP) module, reliable user datagram protocol (RUDP) module, or a datagram congestion control protocol (DCCP) module. A network layer, a transport layer, or a combined transport/network layer can generally be referred to as a packet layer of a network stack.

The network interface driver 140 can include a network interface driver software module running on the real OS 170. As an example, the network interface driver 140 can be a collection of computer executable instructions stored in the memory 150 that when executed by a processor help facilitate network communications. As another example, the network interface driver 140 can be implemented as logic in a hardware processor or other integrated circuit, or as a combination of hardware and software logic. The network interface driver 140 can communicate with one of the software virtual machines 130 directly or via a guest OS of the virtual machine 130 and/or the hypervisor 180.

The network interface driver 140 can be included within a layer of a network stack of the real OS 170 of the network device 110. In an example, the network interface driver 140 can be included within a data link layer of a network stack and can communicate with a software module or application that is included in an application layer of the network stack. In another example, the network interface driver 140 can be included within a link layer of a network stack and can communicate with a TCP/IP module that is included in an internet/transport layer of the network stack. In other examples, the functionality occurring within the layer of the network stack can additionally or alternatively be configured to receive packets from another network or transport layer protocol module, such as a UDP module, RDP module, RUDP module, or a DCCP module. While not shown, the network interface driver 140 can be included as a portion of the network interface card 160.

The network interface card 160 can be configured to transfer data packets over a network protocol, such as a layer 2 protocol. The network interface card 160 can include a packet forwarder 162, a priority arbiter 164, and a cache 166.

The cache 166 can store data and/or computer executable instructions related to the operation and use of the network interface card 160. For example, the cache can store a subset of the connection entries from the memory 150. These connection entries can be fetched from the memory 150 or evicted to the memory 150. The cache 166 can include a HBM, a DRAM, a SDRAM, and/or a flash memory, as examples.

The packet forwarder 162 can be implemented in an application-specific integrated circuit (ASIC) or as software executing on a microprocessor. The packet forwarder 162 can receive packets for transmission from the virtual machines 130 and route them to one or more destination virtual machines executing on remote network devices. The packet forwarder 162 can also perform functions that allow the network interface card 160 to act as a destination for data packets received over the links 127. For example, the packet forwarder 162 can receive a data packet over one of the lines 127, decapsulate the data packet, and forward the data packet to one or more destination virtual machines 130 executing on the network device 110. The packet forwarder 162 can transmit and receive data packets based on the connection entries stored in the cache 166. Each transmission or reception of a data packet can correspond to a transaction for the connection entry.

The priority arbiter 164 can be implemented in an application-specific integrated circuit (ASIC) or as software executing on a microprocessor. The priority arbiter 164 can determine a connection priority for storing connection entries in the cache 166 and can evict connection entries with lower connection priorities from the cache 166 when an eviction threshold is met. The priority arbiter 164 can determine a connection priority based on a likelihood of receiving another transaction for the connection entry. The policy arbiter 164 can perform an eviction policy to ensure bandwidth can be conserved and performance/latency goals can be met.

As described above, only a subset of the connection entries are stored in the cache 166 while the remaining connection entries are stored in the memory 150. The amount of entries stored in the cache 166 compared to the scratchpad memory and memory 150 can be dependent on the respective sizes of the cache 166, scratchpad memory, and memory 150. In one example, up to 8K connections of 16M connections can be stored in the cache 166, up to 64K connections can be stored in the scratchpad memory, and the remainder of the 16M connections can be stored in the memory 150. In another example, up to 4K connections of 4M connections can be stored in the cache 166, up to 16K connections can be stored in the scratchpad memory, and the remainder of the 4M connections can be stored in the memory 150. Based on their respective sizes, the cache 166, scratchpad memory, and memory 150 can store any number of connections, where the scratchpad memory can store a greater number of connections than the cache 166, and the memory 150 can store a greater number of connections than the scratchpad memory.

Based on transaction requests or transactions occurring, connection entries can be fetched from the memory 150 to be stored in the cache 166 or evicted from the cache 166 to be stored in the memory 150. Connection entries stored in the cache 166 can correspond to having an active state and connection entries stored in the memory 150 can correspond to having an idle state. Connection entries with outstanding transactions can also be evicted from the cache 166 to be stored in scratchpad memory, which can be a portion of memory 150 or a separate memory. Connection entries in the scratchpad memory can correspond to having a dormant state, where a current state of the connection is stored, including bitmap, sequence numbers, and resource counts. The current state of the connection can be fetched from the scratchpad memory for subsequent processing.

Figure 2:
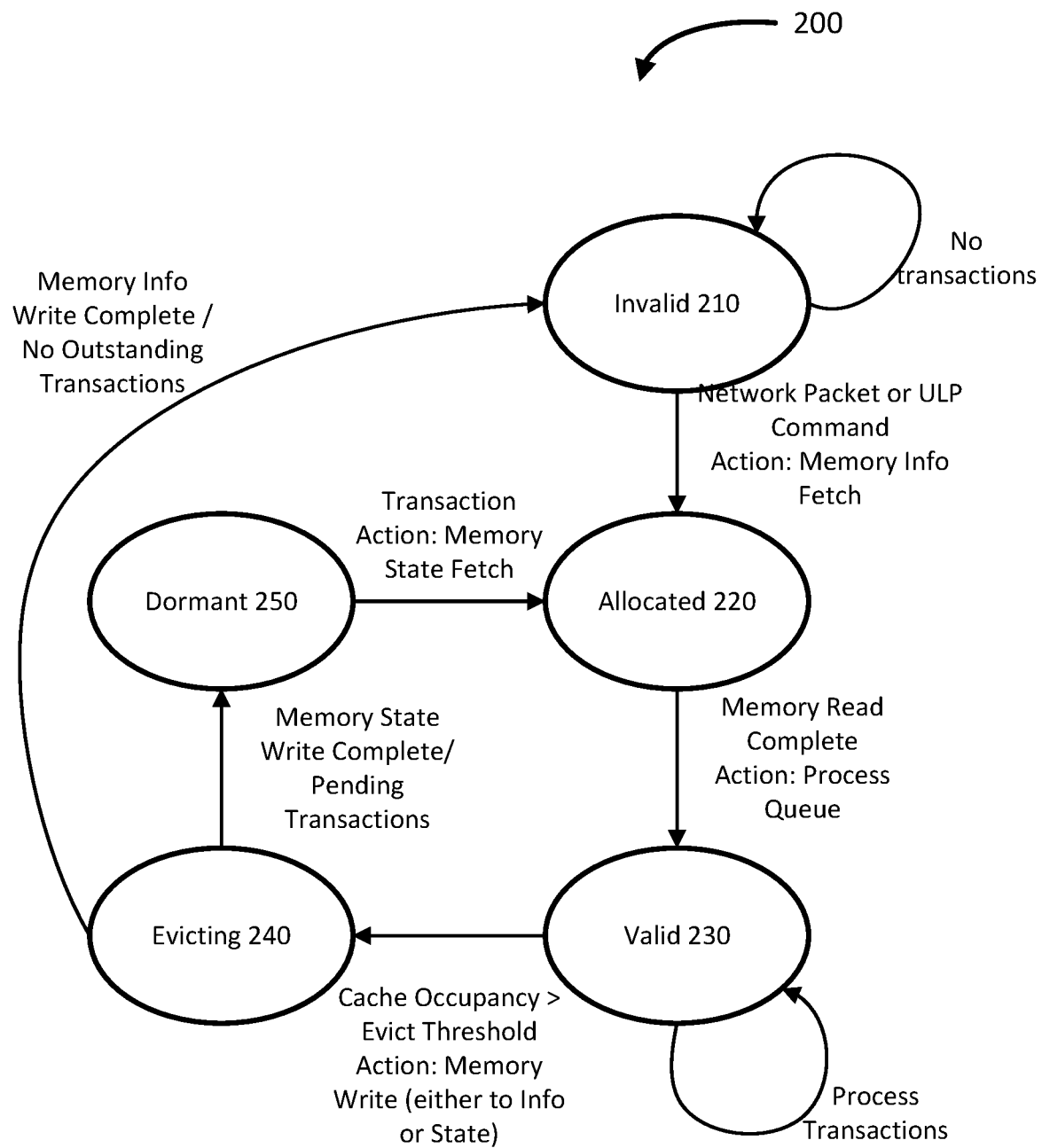
FIG. 2 depicts a block diagram of example state transitions for a connection according to aspects of the disclosure.

FIG. 2 depicts a block diagram of example state transitions 200 for a connection. State transitions 200 can include invalid 210, allocated 220, valid, 230, evicting 240, and dormant 250. For a connection entry with the invalid state 210, no transactions related to the connection entry are occurring. The connection entry can transition to an allocated state 220 when the connection entry is fetched from the memory 150 to the cache 166 based on a transaction command, such as a network packet or user language program (ULP) command. The connection entry can transition to a valid state 230 when it is processed in the cache 166 based on the pending transaction. In the valid state 230, transactions for the connection entry can be processed. When a cache occupancy becomes greater than a threshold, the connection entry can transition to an evicting state 240, where the connection entry is evicted to the memory 150 or scratchpad memory. The connection entry can be evicted to the memory 150 when there are no outstanding transactions, such that the connection entry transitions back to the invalid state 210. The connection entry can be evicted to the scratchpad memory when there are still pending transactions, such that the connection entry transitions to the dormant state 250. To process the pending transactions, the connection entry can transition from the dormant state 250 to the allocated state 220.

To optimize the memory bandwidth, when a connection entry transitions from the valid state 230 to the dormant state 250, the connection entry can be partitioned and stored in two sets. The first set can include fields which are not modified by hardware, such as read only, and the second set can include fields which hardware can update, such as write. The read only fields can be written to the memory state only once when the connection entry is evicted and in the dormant state, such that all successive eviction would only need to update the write fields.

Figure 3:
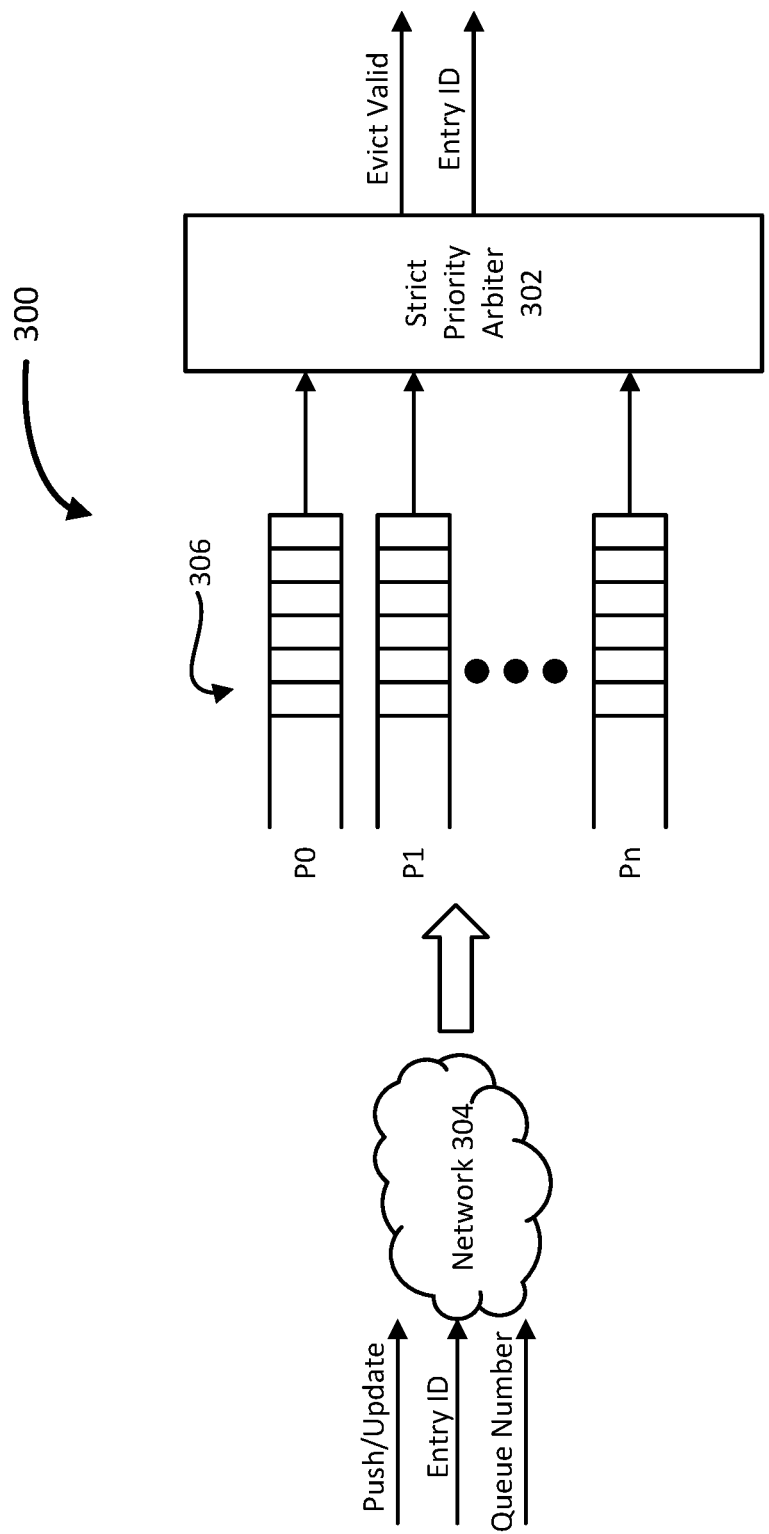
FIG. 3 depicts a block diagram of an example eviction policy executed by a priority arbiter according to aspects of the disclosure.

FIG. 3 depicts a block diagram of an example eviction policy 300 executed by a priority arbiter 302. The priority arbiter 302 can correspond to the priority arbiter 164 and a network 304 can correspond to the network 120, as depicted in FIG. 1. The priority arbiter 302 can correspond to a strict priority arbiter that can pick a queue with the highest priority for eviction, e.g. lowest priority connections, before picking entries from any other queue.

The priority arbiter 302 can generally support three cache operations: a push operation, an update operation, and a pop operation. For the push operation, the priority arbiter 302 can add a connection entry a tail of a corresponding priority queue 306 based on its input priority. For the update operation, the priority arbiter 302 can move a connection entry from its existing place in a priority queue to the tail of the same priority queue, or the priority arbiter 302 can delete the connection entry from the priority queue and add the connection entry to the tail of a different priority queue. For the pop operation, the connection entry can be evicted from a head of a priority queue 306 and subsequent entries can be moved up to the head of the priority queue.

The priority arbiter 302 can classify incoming connection entries from the network 304 to determine in which of a plurality of priority queues 306 of a cache to store the connection entry. The cache can correspond to the cache 166 as depicted in FIG. 1. The cache can include any number of priority queues, such as 8, 16, or 32 priority queues. Each connection entry can include an operation, such as push or update, an entry identification, and a queue number based on its classification from the priority arbiter 302.

The priority arbiter 302 can classify connection entries with a connection priority, which is based on a likelihood of receiving another transaction for the connection. Parameters to determine a likelihood of receiving another transaction can include a resource count and a recency. A resource count can correspond to an amount of resources to determine outstanding transactions, which can include packet context, a buffer for a transmitter, and/or a buffer for a receiver. A recency can correspond to when the last transaction occurred and can be determined from an initial priority based on the resource count and reduced over time based on an aging function, such as a least recently used (LRU) aging function or a scalar aging function.

The priority arbiter 302 can classify the connection entries into buckets based on their determined priority from a programmable command status register (CSR) mapping table. For example, a mapping table could have 9 priority levels based on resource count and recency. The lowest priority level can correspond to a zero resource count and old recency, the next priority level can correspond to the zero resource count and a middle recency, and the next priority level can correspond to the zero resource count and a new recency. The next priority level can correspond to a level 1 resource count and the old recency, the next priority level can correspond to the level 1 resource count and the middle recency, and the next priority level can correspond to the level 1 resource count and the new recency. The next priority level can correspond to a level 2 resource count and the old recency, the next priority level can correspond to the level 2 resource count and the middle recency, and the highest priority level can correspond to the level 2 resource count and the new recency.

Determining the resource count level and recency type can be based on occupancy and timeframe thresholds, respectively. For example, level 1 can correspond to 1-3000 resources occupied and level 2 can correspond to 3001-6000 resources occupied. As another example, old can correspond to 0-5000 cycles since the connection was last used, middle can correspond to 5001-10000 cycles since the connection was last used, and new can correspond to 10001 or greater cycles since the connection was last used. It should be noted that the mapping table can include any number of priority levels based on any number of occupancy thresholds and timeframe thresholds.

The following is an example implementation of the priority queue buckets for 8 occupancy levels with the priority determined by a CSR programmable mapping table.

| Priority | Occupancy | Levels |
|----------|-----------|--------|
| B0 | 0 | Zero resource count |
| B1 | 1-3000 | Level1 resource count |
| B2 | 3001-6000 | Level2 resource count |
| B3 | 6001-9000 | Level3 resource count |
| B4 | 9001-12000 | Level4 resource count |
| B5 | 12001-15000 | Level5 resource count |
| B6 | 15001-18000 | Level6 resource count |
| B7 | 18001-20000 | Level7 resource count |

The connection entries can be stored in multiple priority queues 306 in the cache. The number of priority queues 306 and a scheme for pushing a connection entry into a priority queue 306 can be configurable via client and/or user software. For example, a connection entry can be pushed into the lowest or highest available priority queue 306. More specifically, a connection entry can be pushed into P0, but if that queue is full, the connection entry can be pushed into P1. Similar to the connection entries themselves, the priority arbiter can assign a fixed priority to the priority queues 306 to determine which connection entries to evict first. The assigned priority for each priority queue 306 can be based on resource counts, recencies, and total number of available connection entries that can be stored in the connection cache. For example, 16 priority queues can be assigned priorities from 0-15, with each priority based on threshold ranges for resource count, recency timeframes, and the total possible connection entries that can be stored.

The priority arbiter 302 can change a priority for an existing connection entry in the cache. For example, the priority arbiter 302 can delete the connection entry from its current queue and push the connection entry to a tail of another priority queue. In another example, if an existing connection entry is updated in the same queue, the priority arbiter 302 can move the connection entry from its existing place in the priority queue to the tail of the queue. This can ensure most recently accessed connection entries are at a tail of the priority queue and least recently accessed connection entries are at a head of the priority queue.

The priority arbiter 302 identifies connection entries to be evicted from the cache when an occupancy of the cache reaches above an eviction threshold. The eviction threshold can be based on a total number of connection entries supported in the cache, such that the eviction threshold can be equal to or less than the total number of connection entries supported in the cache. For example, the eviction threshold can correspond to 8K if the cache can store 8K connection entries. As another example, the eviction threshold can correspond to 7K if the cache can store 8K connection entries to account for eviction latency and have some buffer room to absorb inflight requests while previous connections are being evicted. The eviction threshold can be a programmable CSR threshold.

The priority arbiter 302 can evict the lowest priority connection entries first, evicting incrementally higher priority connection entries until the occupancy of the cache is below the eviction threshold. The priority arbiter 302 can initiate the eviction process when the eviction threshold is reached. The eviction can start from a head of a first priority queue, e.g., priority queue 0, and move onto a subsequent priority queue, e.g., priority queue 1, once all connection entries in the first priority queue have been evicted. Evicted entries can be deallocated from the priority queue.

Figure 4:
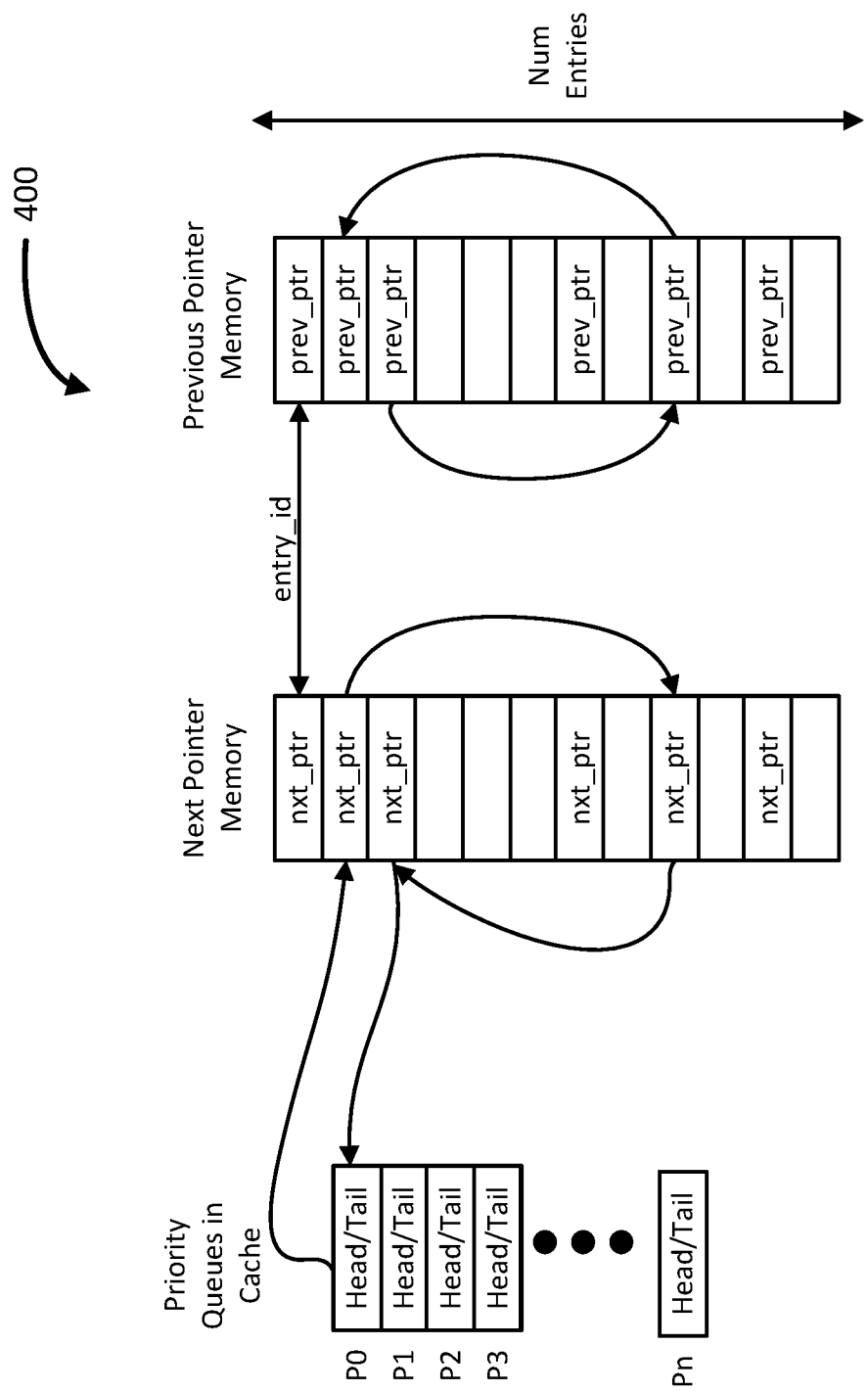
FIG. 4 depicts a block diagram of pointers for cache operations according to aspects of the disclosure.

FIG. 4 depicts a block diagram of pointers for cache operations 400. As described above, the cache operations 400 can include a push operation, update operation, and pop operation. A push operation pushes a connection entry to a tail of a priority queue. An update operation deletes a connection entry from an existing priority queue and pushes the connection entry to the tail of a new or the same priority queue. A pop operation popped a connection entry from a head of a priority queue and assigned a head pointer to the next entry. Pointers can be used for the push, update, and pop operations.

Push operations can include setting tail_pointer. nxt_pointer to equal entry_id, setting entry_id.prev_pointer to equal tail_pointer, and setting tail_pointer to equal entry_id. These actions push an entry at the tail of a queue. Update operations can include reading entry_id to get it to nxt_pointer and prev_pointer. Update operations can further include setting prev_pointer.nxt_pointer to equal nxt_pointer, setting nxt_pointer.prev_pointer to equal prev_pointer, setting tail_pointer.nxt_pointer to equal entry_id, setting entry_id.prev_pointer to equal tail_pointer, and setting tail_pointer to equal entry_id. These actions move an entry from its existing place to the tail of another queue. Pop operations can include the output evicted entry being equal to head_pointer and setting head_pointer to equal head_pointer.nxt_pointer. These actions pop the entry from the head pointer, which points to the next entry in the queue.

Update operations can require 1 read and 2 writes each in a next pointer and previous pointer memories. Therefore, these memories can correspond to a 1r2w memory. A 1r2w memory can support 1 read and 2 writes per cycle. If update operations are not included, then only 1 read and 1 write can be required, allowing the memories to correspond to a 1r1w memory.

Figure 5:
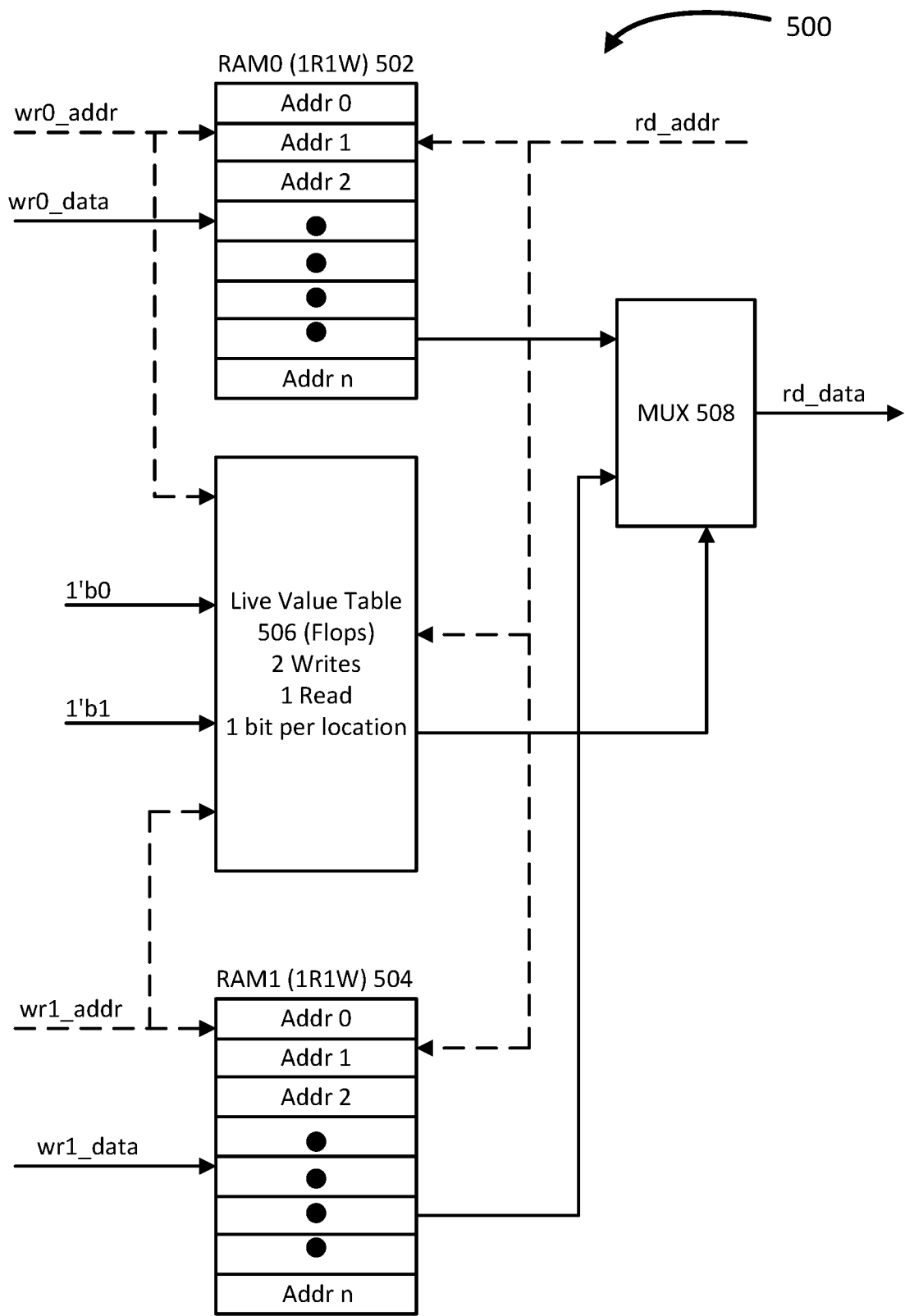
FIG. 5 depicts a block diagram of an example 1r2w memory according to aspects of the disclosure.

FIG. 5 depicts a block diagram of an example 1r2w memory 500. The 1r2w memory 500 can correspond to the cache 166 as depicted in FIG. 1. The 1r2w memory 500 can include a first RAM 502, a second RAM 504, a live value table (LVT) 506, and a multiplexer 508. The 1r2w memory 500 can be configured using the LVT 506, which has one RAM per write port. To support 2 writes per cycle, two 1R1W RAMs 502, 504 can be included.

A first write port can write in the first RAM 502 and a second write port can write in the second RAM 504. When either port writes, they can also update a corresponding entry in the LVT 506. Since both ports can write in the LVT 506 each cycle, the LVT 506 can be implemented in flops.

The LVT 506 can maintain a bit per entry to identify the RAM which has a latest value for a particular address. For example, when the first write port writes to an address in the first RAM 502, the first write port can update the corresponding address entry in the LVT 506 to "0". Similarly, when the second write port writes to an address in the second RAM 504, the second write port can update the corresponding address entry in the LVT 506 to "1". At a time of reading, both RAMs 502, 504 can be read along with the LVT 506 and the output LVT value can be used by the multiplexer 508 to select the output data from the RAMs 502, 504.

Figure 6:
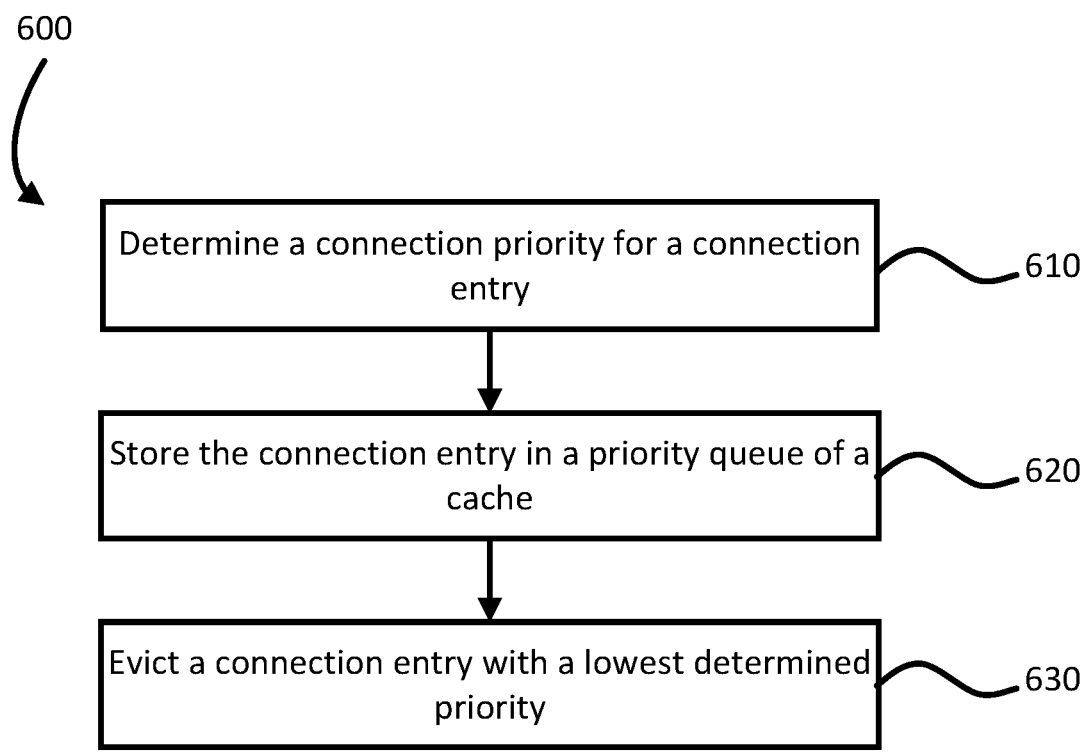
FIG. 6 depicts a flow diagram of an example process for evicting connection entries from a cache according to aspects of the disclosure.

FIG. 6 depicts a flow diagram of an example process 600 for evicting connection entries from a cache. The example process 600 can be performed on a system of one or more processors in one or more locations, such as the priority arbiter 164 of the network device 110 as depicted in FIG. 1.

As shown in block 610, the priority arbiter 164 can determine a connection priority for each connection entry of a plurality of connection entries. The priority arbiter 164 can determine the connection priority based on a likelihood of receiving another transaction for the connection entry. The likelihood of receiving another transaction for the connection entry can be based on a resource count and a recency. The resource count can correspond to an amount of resources to determine outstanding transactions and the recency can correspond to when the last transaction occurred, which can be determined from an initial priority based on the resource count and reduced over time based on an aging function.

As shown in block 620, the priority arbiter 164 can store each connection entry in one or more priority queues of a cache, such as cache 166 as depicted in FIG. 1, based on the determined connection priority. Each connection entry can be subsequently pushed into a lowest or highest available priority queue.

As shown in block 630, the priority arbiter 164 can evict one or more connection entries from the cache when an occupancy of the cache is greater than an eviction threshold. The eviction threshold can be based on a total number of connection entries supported in the cache. The priority arbiter 302 can evict the lowest priority connection entries first, evicting incrementally higher priority connection entries until the occupancy of the cache is below the eviction threshold. The eviction can start from a head of a first priority queue and move onto a subsequent priority queue once all connection entries in the first priority queue have been evicted. Evicted entries can be deallocated from the priority queue.

Figure 7:
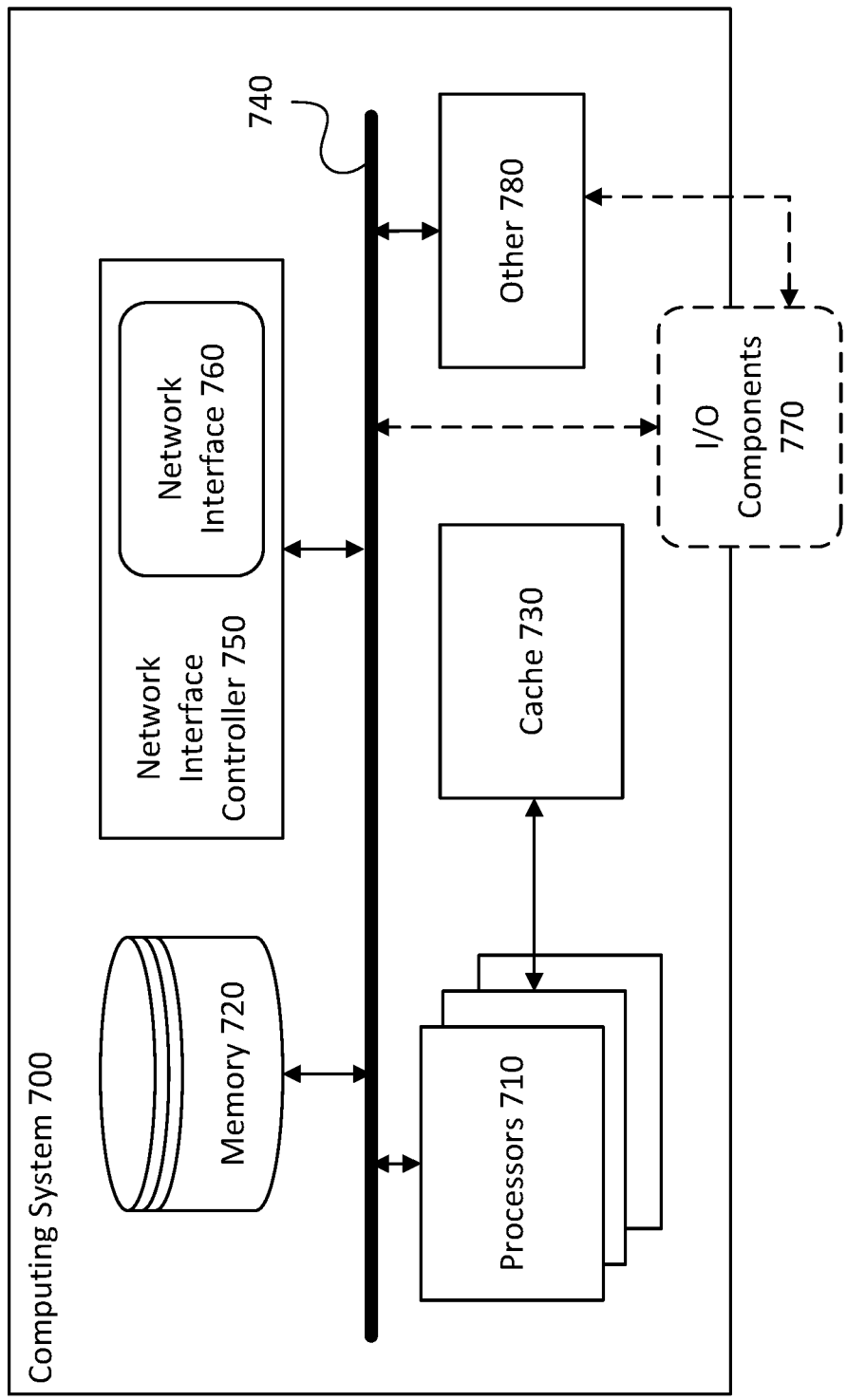
FIG. 7 depicts a block diagram of an example computing system according to aspects of the disclosure.

FIG. 7 depicts an example computing system 700, which can be configured as the network device 110 of FIG. 1. The computing system 700 can include one or more processors 710 in communication with memory 720, at least one network interface controller 750 with network interface port 760 for connection to a network, input/output (I/O) components 770, and other components 780. The processors 710 can be in communication with the memory 720, network interface controller 750, I/O components 770, and other components 780 via a bus 740, as an example. The processors 710 can incorporate, or are connected to, cache memory 730. In some instances, instructions are read from memory 720 into cache memory 730 and executed by the processors 710 from cache memory 730.

The processors 710 can be any logic circuitry that executes instructions fetched from the memory 720 or cache 730. The processors 710 can be microprocessor units or special purpose processors. The computing device 700 can be based on any processor, or set of processors, capable of operating as described herein. The processors 710 can be single core or multi-core processors. The processors 710 can be multiple distinct processors. The processors 710 can be implemented as circuitry on one or more chips.

The memory 720 can be any device suitable for storing computer readable data. The memory 720 can be a device with fixed storage or a device for reading removable storage media. Examples include all forms of non-volatile memory, media and memory devices, semiconductor memory devices, e.g., EPROM, EEPROM, SDRAM, and flash memory devices, magnetic disks, magneto-optical disks, and optical discs, e.g., CD ROM, DVD-ROM, or Blu-Ray® discs. The computing system 600 can have any number of memory devices 720.

The cache memory 730 can be a form of computer memory placed in close proximity to the processors 710 for fast access times. The cache memory 730 can be part of, or on the same chip as, the processors 710. There can be multiple levels of cache 730, e.g., level 2 and level 3 cache layers.

The network interface controller 750 can manage data exchanges via the network interface 760. The network interface controller 750 can handle the physical and data link layers of the open systems interconnection (OSI) model for network communication. Some of the tasks of the network interface controller 750 can be handled by one or more of the processors 710. The network interface controller 750 can be incorporated into the processors 710, such as circuitry on the same chip.

The computing system 700 can have multiple network interfaces 760 controlled by a single controller 750 or multiple network interface controllers 750. Each network interface 760 can be a connection point for a physical network link, e.g., a cat-5 Ethernet link. The network interface controller 750 can support wireless network connections and an interface port 760 can be a wireless, e.g., radio, receiver/transmitter. The network interface controller 750 can implement one or more network protocols such as Ethernet. The computing system 700 can exchange data with other computing systems via physical or wireless links through a network interface 760. The network interface 760 can link directly to another device or to another device via an intermediary device, e.g., a network device such as a hub, a bridge, a switch, or a router, connecting the computing device 700 to a data network such as the Internet.

The computing system 700 can include, or provide interfaces for, one or more input or output (I/O) components 770. Input devices can include keyboards, microphones, touch screens, sensors, and pointing devices, such as a mouse or trackball, as examples. Output devices can include video displays, speakers, and printers, as examples.

Other components 780 can include an I/O interface, external serial device ports, and any additional co-processors. For example, the computing system 700 may include an interface, e.g., a universal serial bus (USB) interface, for connecting input devices, output devices, or additional memory devices, e.g., portable flash drive or external media drive. The computing device 700 can include an additional co-processor, such as a math co-processor to assist the processors 710 with high precision or complex calculations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. A method for evicting connection entries from a cache, the method comprising:
   determining, with one or more processors, a connection priority for each of a plurality of connection entries based on a likelihood of receiving a transaction for each of the connection entries;
   storing, with the one or more processors, each of the plurality of connection entries in at least one of a plurality of priority queues in the cache based on the determined connection priority for each connection entry; and
   evicting, with the one or more processors, a connection entry of the plurality of connection entries from a priority queue of the plurality of priority queues when an occupancy of the cache is above an eviction threshold, the connection entry being evicted having a lowest determined connection priority.

2. The method of claim 1, wherein the likelihood of receiving the transaction is based on a resource count and a recency of receiving a previous transaction.

3. The method of claim 2, wherein the resource count comprises an amount of outstanding transactions.

4. The method of claim 2, wherein determining the connection priority for each of the plurality of connection entries further comprises:
   determining, with the one or more processors, an initial connection priority for a connection entry of the plurality of connection entries based on a resource count; and
   reducing, with the one or more processors, the initial connection priority based on the recency of receiving a previous transaction to determine the connection priority for the connection entry.

5. The method of claim 1, further comprising updating, with the one or more processors, the connection priority of at least one connection entry of the plurality of connection entries.

6. The method of claim 5, wherein updating the connection priority of the at least one connection entry comprises moving the at least one connection entry from its existing slot in a respective priority queue to a tail of the same priority queue.

7. The method of claim 5, wherein updating the connection priority of the connection entry comprises moving the connection entry from its existing slot in a respective priority queue to a tail of a different priority queue.

8. The method of claim 1, further comprising pushing, with the one or more processors, a new connection entry to a tail of at least one of the plurality of priority queues based on a determined priority for the new connection entry.

9. The method of claim 1, wherein storing the plurality of connection entries further comprises storing lower priority connection entries closer to a head of at least one of the plurality of priority queues and higher priority connection entries closer to a tail of at least one of the plurality of priority queues.

10. The method of claim 9, wherein evicting the connection entry further comprises evicting a connection entry from a head of the priority queue.

11. A system comprising:
   one or more processors; and
   one or more storage devices coupled to the one or more processors and storing instructions that, when executed by the one or more processors, causes the one or more processors to perform operations for evicting connection entries from a cache, the operations comprising:
      determining a connection priority for each of a plurality of connection entries based on a likelihood of receiving a transaction for each of the connection entries;
      storing each of the plurality of connection entries in at least one of a plurality of priority queues in the cache based on the determined connection priority for each connection entry; and
      evicting a connection entry of the plurality of connection entries from a priority queue of the plurality of priority queues when an occupancy of the cache is above an eviction threshold, the connection entry being evicted having a lowest determined connection priority.

12. The system of claim 11, wherein the likelihood of receiving the transaction is based on a resource count and a recency of receiving a previous transaction, the resource count comprising an amount of outstanding transactions.

13. The system of claim 12, wherein determining the connection priority for each of the plurality of connection entries further comprises:
   determining an initial connection priority for a connection entry of the plurality of connection entries based on a resource count; and
   reducing the initial connection priority based on the recency of receiving a previous transaction to determine the connection priority for the connection entry.

14. The system of claim 11, wherein the operations further comprise updating the connection priority of at least one connection entry of the plurality of connection entries.

15. The system of claim 14, wherein updating the connection priority of the at least one connection entry comprises moving the at least one connection entry from its existing slot in a respective priority queue to a tail of the same priority queue.

16. The system of claim 14, wherein updating the connection priority of the connection entry comprises moving the connection entry from its existing slot in a respective priority queue to a tail of a different priority queue.

17. The system of claim 11, wherein the operations further comprise pushing a new connection entry to a tail of at least one of the plurality of priority queues based on a determined priority for the new connection entry.

18. The system of claim 11, wherein storing the plurality of connection entries further comprises storing lower priority connection entries closer to a head of at least one of the plurality of priority queues and higher priority connection entries closer to a tail of at least one of the plurality of priority queues.

19. The system of claim 18, wherein evicting the connection entry further comprises evicting a connection entry from a head of the priority queue.

20. A non-transitory computer readable medium for storing instructions that, when executed by one or more processors, causes the one or more processors to perform operations for evicting connection entries from a cache, the operations comprising:
   determining a connection priority for each of a plurality of connection entries based on a likelihood of receiving a transaction for each of the connection entries;
   storing each of the plurality of connection entries in at least one of a plurality of priority queues in the cache based on the determined connection priority for each connection entry; and evicting a connection entry of the plurality of connection entries from a priority queue of the plurality of priority queues when an occupancy of the cache is above an eviction threshold, the connection entry being evicted having a lowest determined connection priority.

* * * * *